United States Patent
Sharma et al.

(10) Patent No.: US 9,538,016 B2
(45) Date of Patent: Jan. 3, 2017

(54) HANDLING OF REDUCED PARTIAL CDRS IN AN OFFLINE CHARGING SYSTEM

(71) Applicant: Alcatel-Lucent USA Inc., Murray Hill, NJ (US)

(72) Inventors: Ranjan Sharma, New Albany, OH (US); Yigang Cai, Naperville, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 119 days.

(21) Appl. No.: 14/530,367

(22) Filed: Oct. 31, 2014

(65) Prior Publication Data
US 2016/0127563 A1 May 5, 2016

(51) Int. Cl.
*H04W 4/00* (2009.01)
*H04M 15/00* (2006.01)
*H04W 4/24* (2009.01)
*H04L 12/14* (2006.01)

(52) U.S. Cl.
CPC .......... *H04M 15/65* (2013.01); *H04L 12/1403* (2013.01); *H04M 15/41* (2013.01); *H04M 15/60* (2013.01); *H04M 15/64* (2013.01); *H04W 4/24* (2013.01)

(58) Field of Classification Search
CPC ...... H04M 15/65; H04M 15/60; H04M 15/41; H04M 15/64; H04L 12/1403
See application file for complete search history.

(56) References Cited

U.S. PATENT DOCUMENTS

| | | | |
|---|---|---|---|
| 8,463,671 B1* | 6/2013 | Cohen .................. | G06Q 20/102 705/30 |
| 9,161,199 B1* | 10/2015 | Sharma .................... | H04L 12/14 |
| 2007/0036312 A1* | 2/2007 | Cai ........................ | H04M 15/00 379/126 |
| 2008/0082455 A1* | 4/2008 | Cai ........................ | G06Q 20/085 705/77 |
| 2008/0181378 A1* | 7/2008 | Cai ........................ | H04M 15/00 379/121.01 |
| 2008/0182549 A1* | 7/2008 | Cai .......................... | H04L 12/14 455/406 |

(Continued)

OTHER PUBLICATIONS

3rd Generation Partnership Project, Technical Specification Group Services and System Aspects; Telecommunication management; Charging management; Charging architecture and principles, 3GPP TS 32.240, Version 12.5.0 (Sep. 2014), pp. 1-52.

(Continued)

*Primary Examiner* — Robert Wilson
(74) *Attorney, Agent, or Firm* — Duft Bornsen & Fettig, LLP

(57) ABSTRACT

Systems and methods that handle partial Charging Data Records (CDRs) for a session. An offline charging system includes a cluster of Charging Gateway Functions (CGF). A first CGF of the cluster receives a first Fully Qualified Partial CDR (FQPC) for a session, and stores FQPC data based on the first FQPC in a centralized storage module that is accessible by each of the CGFs in the cluster. A second CGF of the cluster receives a Reduced Partial CDR (RPC) for the session responsive to a failure of the first CGF, retrieves the FQPC data from the centralized storage module, and generates a second FQPC for the session based on the RPC and the FQPC data retrieved from the centralized storage module.

20 Claims, 3 Drawing Sheets

(56) References Cited

U.S. PATENT DOCUMENTS

| | | | | |
|---|---|---|---|---|
| 2012/0059749 A1* | 3/2012 | Sharma | ............... | G06Q 30/04 |
| | | | | 705/34 |
| 2014/0011472 A1* | 1/2014 | Sharma | ............... | H04L 12/1403 |
| | | | | 455/406 |
| 2015/0133080 A1* | 5/2015 | Sharma | ............. | H04M 15/8228 |
| | | | | 455/406 |
| 2015/0229778 A1* | 8/2015 | Sharma | ............... | H04M 15/61 |
| | | | | 455/406 |
| 2015/0281464 A1* | 10/2015 | Cai | ............... | H04L 12/14 |
| | | | | 455/406 |
| 2016/0088468 A1* | 3/2016 | Sharma | ............... | H04W 8/205 |
| | | | | 370/329 |
| 2016/0094722 A1* | 3/2016 | Sharma | ............... | H04M 15/65 |
| | | | | 455/406 |

OTHER PUBLICATIONS

3rd Generation Partnership Project, Charging Data Record (CDR) Transfer, 3GPP TS 32.295, Version 12.0.0 (Sep. 2013), pp. 1-32.
3rd Generation Partnership Project, Charging Data Record (CDR) File Format and Transfer, 3GPP TS 32.297, Version 12.0.0 (Mar. 2014), pp. 1-28.

* cited by examiner

HANDLING OF REDUCED PARTIAL CDRS IN AN OFFLINE CHARGING SYSTEM

TECHNICAL FIELD

The present disclosure is related to the field of communication systems and, in particular, to offline charging.

BACKGROUND

Service providers typically provide numerous voice and data services to end users (also referred to as subscribers). Examples of voice services are voice calls, call forwarding, call waiting, etc. Examples of data services are streaming audio, streaming video, Voice over Internet Protocol (VoIP), online gaming, and IP-TV. The data services are managed by a packet-switched (PS) core network, which interfaces the end user with external Packet Data Networks (PDN), such as the Internet. Some examples of PS-core networks are a General Packet Radio Service (GPRS) core network, an Evolved Packet Core (EPC) of a Long Term Evolution (LTE) network, etc. Mobile devices, such as cell phones, personal data assistants, smart phones, notebook computers, etc., may access the data services provided by the networks over an air interface with one or more base stations. The service providers use offline and online charging functions to keep track of the resource usage incurred by each device for using the various services. The 3GPP/3GPP2 standards groups have defined a set of specifications that may be used to implement online charging systems and offline charging systems in the various network domains (e.g., a circuit-switched domain, a packet-switched domain, and/or a wireless domain), IP multimedia subsystems (IMS), and emerging 3G/OMA application services.

According to the 3GPP TS 32.240 specification, offline charging is a process where charging information for network resource usage is collected concurrently with the resource usage. The charging information is passed through a chain of charging functions, which results in the generation of Charging Data Record (CDR) files that are transferred to the network operator's billing domain for subscriber billing and/or inter-operator accounting. To implement offline charging, a Charging Trigger Function (CTF) is implemented in a network element that provides a service. The CTF collects information pertaining to chargeable events, assembles this information into matching charging events, and sends the charging events to a Charging Data Function (CDF), which may be implemented in the network element or in the Offline Charging System (OFCS).

The CDF receives the charging events from one or more CTFs, and uses the information included in the charging events to construct CDRs. A CDR is a formatted collection of information about a chargeable event (e.g., time of call set-up, duration of the call, amount of data transferred, etc.) for use in billing and accounting. The CDF then sends the CDRs to a Charging Gateway Function (CGF) of the OFCS. The CGF acts as a gateway between the network and the billing domain. Therefore, the CGF collects CDRs from the CDF (and other CDFs), optionally correlates the CDRs and writes the CDRs into a CDR file, and makes the CDR file available to the billing domain.

The 3GPP TS 32.240 specification provides for the support of Fully Qualified Partial CDRs (FQPCs) and Reduced Partial CDRs (RPCs) between a CDF and a CGF. A FQPC is a partial CDR that contains a complete set of the fields specified for the CDR type. This includes all the mandatory and conditional fields as well as those fields that the network operator has provisioned to be included in the CDR. A RPC is a partial CDR that only provides mandatory fields and information regarding changes in the session parameters relative to the previous partial CDR. As an example, the first partial CDR sent from a CDF to a CGF is a FQPC that includes all necessary fields. This FQPC acts as the basis for providing the missing information in RPCs subsequently received by the CGF for the same session. If information for the session has not changed, then the CGF may receive a RPC from the CDF. Upon receiving the RPC, the CGF is able to construct another FQPC from the RPC based on the prior FQPC it received for the same session.

SUMMARY

Embodiments described herein provide a way to handle RPCs within an offline charging system. When a CGF receives a FQPC for a session, it stores data for the FQPC (e.g., a copy) in a centralized storage module that is accessible by each of the CGFs within the offline charging system. The FQPC data stored in the centralized storage module acts as reference data for any CGF that receives a RPC for the session without first receiving a FQPC for the session. For instance, if there is a failure of a primary CGF that handles partial CDRs for the session, then a RPC may be routed to a secondary CGF. However, the secondary CGF did not previously receive a FQPC for this session. When a scenario such as this occurs, the second CGF may fetch the FQPC data from the centralized storage module, and use the FQPC data and the RPC data to construct another FQPC for the session. Thus, the RPC can be reconstructed into a FQPC based on the data stored in the centralized storage module.

One embodiment comprises an offline charging system comprising a cluster of Charging Gateway Functions (CGF) implemented on at least one hardware platform. A first CGF of the cluster is configured to receive a first FQPC for a session, and to store FQPC data from the first FQPC in a centralized storage module that is accessible by each of the CGFs in the cluster. The second CGF of the cluster is configured to receive a RPC for the session responsive to a failure of the first CGF, to retrieve the FQPC data from the centralized storage module, and to generate a second FQPC for the session based on the RPC and the FQPC data retrieved from the centralized storage module.

In another embodiment, the first CGF is configured to store the FQPC data as an object in the centralized storage module, and to assign a name to the object based on a charging ID assigned to the session.

In another embodiment, the second CGF is configured to extract the charging ID for the session from the RPC, to derive the name of the object for the FQPC data based on the charging ID, and to retrieve the object for the FQPC data from the centralized storage module based on the name of the object.

In another embodiment, the second CGF is configured to receive a third FQPC for the session, and to update the FQPC data in the centralized storage module based on the third FQPC.

In another embodiment, the second CGF is configured to identify an end to the session, and to delete the FQPC data from the centralized storage module responsive to the end of the session.

In another embodiment, the centralized storage module comprises cloud storage.

In another embodiment, the offline charging system includes a back-end distributor connected between the cluster of CGFs and a cluster of Charging Data Functions (CDF).

The back-end distributor is configured to distribute partial CDRs from the cluster of CDFs to the cluster of CGFs.

In another embodiment, if the second CGF received a prior FQPC for the session, then the second CGF is configured to retrieve the prior FQPC from local memory, and to generate the second FQPC for the session based on the RPC and the prior FQPC retrieved from the local memory.

Another embodiment comprises a method of operating an offline charging system comprising a cluster of CGFs. The method includes receiving a first FQPC for a session in a first CGF of the cluster, and storing FQPC data from the first FQPC in a centralized storage module that is accessible by each of the CGFs in the cluster. The method further includes receiving a RPC for the session in a second CGF of the cluster responsive to a failure of the first CGF, retrieving the FQPC data from the centralized storage module, and generating a second FQPC for the session in the second CGF based on the RPC and the FQPC data retrieved from the centralized storage module.

Another embodiment comprises an offline charging system comprising a cluster of CGFs. A CGF of the cluster is configured to receive a partial CDR for a session, and to determine whether the partial CDR comprises a FQPC or a RPC. When the partial CDR comprises a FQPC, the CGF is configured to store FQPC data from the FQPC in a centralized storage module that is accessible by each of the CGFs in the cluster. When the partial CDR comprises a RPC, the CGF is configured to determine whether a prior FQPC was received for the session in the CGF, to retrieve the FQPC data from the centralized storage module responsive to a determination that the prior FQPC was not received in the CGF, and to generate a second FQPC for the session based on the RPC and the FQPC data retrieved from the centralized storage module.

In another embodiment, when the partial CDR comprises a RPC, the CGF is configured to retrieve the FQPC data from local memory responsive to a determination that the prior FQPC was received in the CGF, and to generate a second FQPC for the session based on the RPC and the FQPC data retrieved from local memory.

The above summary provides a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the disclosure are now described, by way of example only, and with reference to the accompanying drawings. The same reference number represents the same element or the same type of element on all drawings.

DESCRIPTION OF EMBODIMENTS

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Unless otherwise indicated, the terms "first", "second", etc., are used herein merely as labels, and are not intended to impose ordinal, positional, or hierarchical requirements on the items to which these terms refer.

Figure 1:
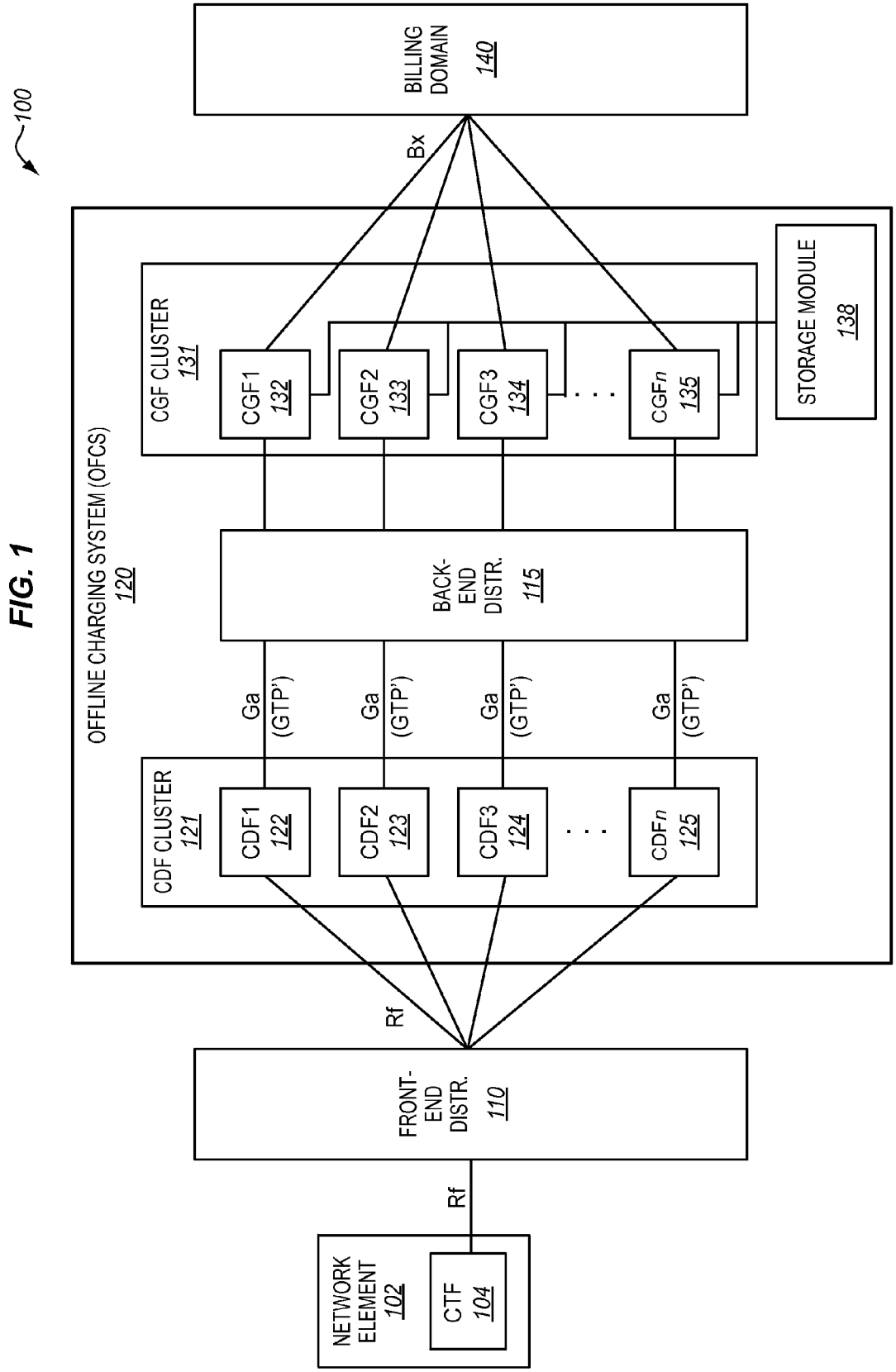
FIG. 1 illustrates an offline charging architecture in an exemplary embodiment.

FIG. 1 illustrates an offline charging architecture 100 in an exemplary embodiment. Architecture 100 may be implemented in a circuit-switched network or a packet-switched network that provides services to its subscribers (i.e., end user and associated User Equipment (UE)) to provide offline charging for the subscribers. Some exemplary networks include IP Multimedia Subsystem (IMS) networks, Long Term Evolution (LTE) networks, General Packet Radio Service (GPRS), etc.

Architecture 100 includes a network element 102 that connects to an offline charging system (OFCS) 120 through a front-end distributor 110. A network element 102 is an apparatus or equipment used in the provision of services provided by a network. For example, a network element may comprise a Serving-Call Session Control Function (S-CSCF) or application server (AS) of an IMS network, a Serving Gateway (SGW) or a Packet Data Network Gateway (PGW) of an LTE network, etc. Network element 102 includes a Charging Trigger Function (CTF) 104 that detects chargeable events for services provided by network element 102, assembles information for the chargeable events into matching charging events, and sends the charging events to a Charging Data Function (CDF). In the case of network element 102, CTF 104 uses a Diameter Rf interface. Therefore, CTF 104 assembles the charging information into accounting requests, such as a Diameter Rf Accounting Request (ACR). Although one CTF 104 is illustrated in FIG. 1, there may be multiple CTFs in contact with front-end distributor 110.

OFCS 120 is an apparatus, a server, a device, or equipment configured to implement offline charging for sessions or services provided by a network. Offline charging can be of two types: session-based or event-based. In event-based charging, the CTF reports the usage or the service rendered where the service offering is rendered in a single operation, such as subscriber registration, re-registration, de-registration, etc. The CTF reports the usage in an ACR EVENT. Session-based charging is the process of reporting usage reports for a session, and uses the START, INTERIM, and STOP accounting data. During a session, CTF 104 may transmit multiple ACR Interims depending on the proceeding of the session.

In this embodiment, OFCS 120 includes a CDF cluster 121 comprising a plurality of CDFs (CDF1-CDFn) 122-125. A CDF comprises an element or module within OFCS 120 that receives charging events from CTFs within network elements, formats the charging events into CDRs, and sends the CDRs to a CGF. OFCS 120 also includes a CGF cluster 131 comprising a plurality of CGFs (CGF1-CGFn) 132-135, and a centralized storage module 138. A CGF comprises an element or module within OFCS 120 that correlates CDRs for a session, and forwards a CDR file with the correlated CDRs to a billing domain 140. Centralized storage module 138 comprises any storage device that is accessible by each CGF 132-135 in the CGF cluster 131. For example, centralized storage module 138 may comprise a storage array on the same platform as CGF cluster 131 in one embodiment. In another embodiment, centralized storage module 138 may comprise cloud storage accessible through a network (not shown). Storage module 138 is considered "centralized" because it is accessible by each CGF 132-135 in CGF cluster 131.

CDFs in OFCS 120 communicate with CGFs over a Diameter Ga interface. In the case shown in FIG. 1, GTP' is used on the Ga interface to transport CDRs from the CDFs to the CGFs. Although not specifically illustrated in FIG. 1, OFCS 120 may include one or more processors or other hardware platforms that implement CDFs 122-125 and CGFs 132-135.

Billing domain 140 is the part of the operator network that receives and processes CDR files for billing mediation and other billing applications (e.g., statistical applications).

Front-end distributor 110 is implemented between CTFs (e.g., CTF 104) and the CDFs 122-125 in OFCS 120. The purpose of front-end distributor 110 is to distribute Diameter requests or accounting requests (e.g., ACRs) from CTFs to the multiple CDFs 122-125 within OFCS 120.

Back-end distributor 115 is implemented between CDFs 122-125 in OFCS 120 and CGFs 132-135. The purpose of back-end distributor 115 is to distribute CDRs from CDFs 122-125 to CGFs 132-135.

Using the distributors eases the operator provisioning task; when systems scale out, the provisioning activity is optimized to the inclusion of new system (or subsystem) identification at the distributor. Thus, in an auto-scaling scenario, when CDFs are added to the network topology, front-end distributor 110 is updated with its information. Similarly, when CGFs are added, back-end distributor 115 is updated. The distributors provide a level of isolation in the offline charging processing chain. However, this prevents a CDF from recognizing a CGF failover, which is a step in determining if the partial CDR that the CDF is about to transmit should be a Fully Qualified Partial CDR (FQPC) or a Reduced Partial CDR (RPC).

The following embodiments illustrate a new way of handling partial CDRs generated within OFCS 120. As an overview, when a FQPC is generated for a session and routed to a CGF in the CGF cluster 131, the CGF stores a copy of the FQPC in centralized storage module 138. This FQPC is accessible by any CGF 132-135 in CGF cluster 131 so that a CGF may identify a complete set of the fields specified for the CDR type for a session. If a CGF in CGF cluster 131 happens to receive a RPC for the session without first receiving a FQPC, such as when there is a failure of another CGF that was selected for the session, then the CGF receiving the RPC can query centralized storage module 138 to retrieve data regarding the FQPC stored for the session. The CGF may process the FQPC for the session along with the RPC to generate another FQPC for the session. Therefore, even though the CGF receives a RPC without first receiving a FQPC for the session, the CGF is able to retrieve the fields required for a FQPC from centralized storage module 138 so that it may also generate a FQPC for the session. When there is a failure of a CGF during the session, the failover CGF is able to generate a FQPC for the session by querying centralized storage module 138. This new method eases the requirement of a CDF to know about a CGF failover, and to determine if an FQPC should be sent instead of an RPC upon such failovers.

To illustrate offline charging, CTF 104 in FIG. 1 detects chargeable events for a service provided by network element 102, and CTF 104 assembles information for the chargeable events into accounting requests. The accounting requests are for a session referenced by a session identifier (ID). Front-end distributor 110 receives the accounting requests from CTF 104 for the session, and selects a destination CDF (e.g., one of CDFs 122-125) for the accounting requests, such as based on a distribution algorithm, a lookup table, etc. Front-end distributor 110 then routes the accounting requests to the selected CDF (e.g., CDF 122).

CDF 122 processes the accounting requests to open or update a CDR for the session. For example, if an accounting request is a "start" message for the beginning of a session, then CDF 122 may open a CDR for the session based on the start message. If an accounting request is an "interim" message during the session, then CDF 122 may update a CDR (already opened) for the session based on the interim message.

There may be instances where CDF 122 closes the CDR before the end of the session, which is referred to as a partial CDR. For example, when CDF 122 first opens a CDR, it may set a timer for closing the CDR if a "stop" message is not received indicating the end of the session. If CDF 122 receives a stop message before expiration of the timer, then CDF 122 closes the CDR for the session to generate a full CDR. If CDF 122 does not receive a stop message before expiration of the timer, then CDF 122 closes the CDR to generate a partial CDR for the session. Also, if CDF 122 receives an accounting request that indicates a service or media change for the session or any of the change conditions defined for offline charging, then CDF 122 may close a CDR to generate a partial CDR for the session. A partial CDR is a type of CDR that provides charging information on part of a session. A long-duration session may be covered by multiple partial CDRs. There are two formats for partial CDRs: FQPC that contains all of the necessary fields; and RPC that has a reduced format. CDF 122 forwards the partial CDR to back-end distributor 115.

One or more CDFs 122-125 may operate in a similar fashion to generate partial CDRs for the session (or other sessions). Each time a CDF generates a partial CDR, it forwards the partial CDR to back-end distributor 115, such as over the Ga reference point. Back-end distributor 115 receives the partial CDRs for the session, and selects a destination CGF (e.g., one of CGFs 132-135) for the partial CDRs, such as based on a distribution algorithm, a lookup table, etc. Back-end distributor 115 then routes the partial CDRs to the selected CGF (e.g., CGF 132). The embodiments below describe how a CGF in CGF cluster 131 handles partial CDRs.

Figure 2:
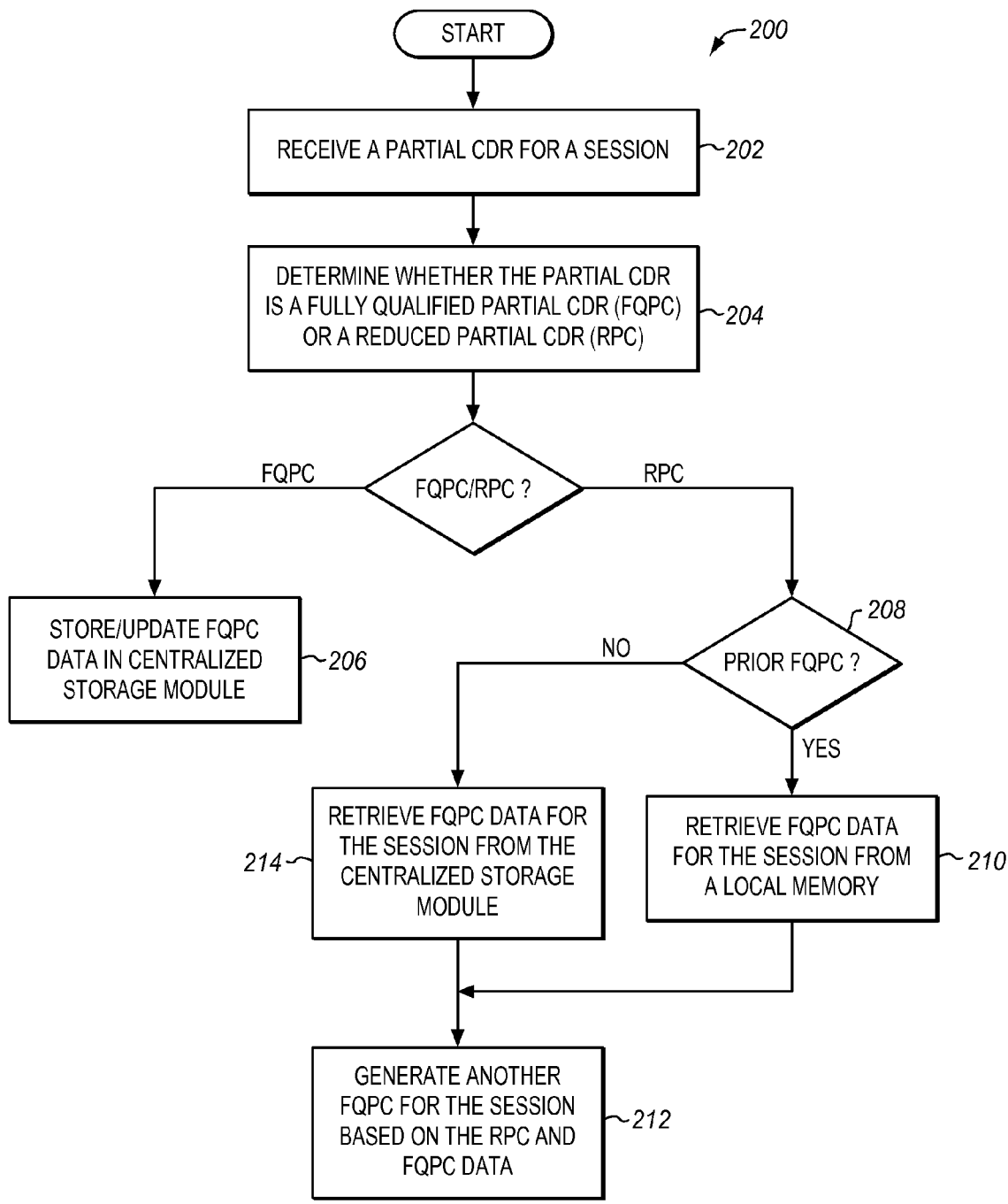
FIG. 2 is a flow chart illustrating a method of handling RPCs in a CGF cluster in an exemplary embodiment.

FIG. 2 is a flow chart illustrating a method 200 of handling RPCs in CGF cluster 131 in an exemplary embodiment. The steps of method 200 will be described with reference to OFCS 120 in FIG. 1, but those skilled in the art will appreciate that method 200 may be performed in other systems. Also, the steps of the flow charts described herein are not all inclusive and may include other steps not shown, and the steps may be performed in an alternative order.

A CGF of CGF cluster 131 receives a partial CDR for the session from back-end distributor 115 (step 202). It is assumed for this embodiment that CGF 132 receives the partial CDR from back-end distributor 115. In response to receiving the partial CDR, CGF 132 determines whether the partial CDR is a FQPC or a RPC (step 204). When the partial CDR is a FQPC, CGF 132 stores FQPC data for the FQPC (e.g., a copy) in centralized storage module 138 (step 206).

CGF 132 may store any desired parameters of the FQPC in centralized storage module 138. The desired parameters may be a complete set of the fields specified for the CDR type. CGF 132 may also store a copy of the FQPC in a local memory. When storing the FQPC in centralized storage module 138, this may be the first instance where a FQPC has been stored in centralized storage module 138 or may be an update to a FQPC already stored in centralized storage module 138. The first time a FQPC is stored in centralized storage module 138, a CGF creates an object in centralized storage module 138 for the FQPC, and stores the FQPC or data associated with the FQPC in the object. If a CGF receives a FQPC for the session but an object has already been created in centralized storage module 138, then the CGF updates the object with new data for the FQPC.

When the partial CDR received from back-end distributor 115 is a RPC, CGF 132 determines whether a prior FQPC was received for the session (step 208). If CGF 132 received a prior FQPC for the session, then CGF 132 would have the prior FQPC stored in a local memory. But there may be instances where CGF 132 may receive a RPC without first receiving a FQPC. For example, if another CGF (e.g., CGF 133) was previously selected for the session but went Out Of Service (OOS) before the session ends, then CGF 132 may receive a RPC without first receiving a FQPC. Because back-end distributor 115 is installed between CDF cluster 121 and CGF cluster 131, the CDFs 122-125 do not know the status of the CGFs 132-135. Therefore, a CDF does not consider the status of CGFs 132-135 when generating a FQPC or RPC for the session. Even if a CGF in CGF cluster 131 goes OOS during a session, a CDF in CDF cluster 121 may still send a RPC to back-end distributor 115 even though the RPC does not have a complete set of fields.

If CGF 132 received a prior FQPC before the RPC, then CGF 132 accesses a local memory to retrieve the FQPC data for the session (step 210). CGF 132 then generates another FQPC for the session based on the RPC and the FQPC data retrieved from local memory (step 212). At some point, CDF 132 correlates the CDRs (including the FQPC), writes the CDRs into a CDR file, and makes the CDR file available to billing domain 140.

If CGF 132 did not receive a prior FQPC before the RPC, then CGF 132 accesses centralized storage module 138 to retrieve FQPC data for the session (step 214). Because CGF 132 did not receive a prior FQPC for the session, CGF 132 may fetch a copy of a prior FQPC from centralized storage module 138. Centralized storage module 138 acts as a centralized repository for FQPCs for the session that is accessible by each CGF 132-135 in cluster 131. CGF 132 then generates another FQPC for the session based on the RPC and the FQPC data retrieved from centralized storage module 138 (step 212).

Method 200 provides a more robust manner of handling RPCs within CGF cluster 131. If/when a primary CGF that was selected for the session goes OOS and a RPC is routed to a secondary CGF that did not previously receive a FQPC for the session, the secondary CGF is able to access centralized storage module 138 to retrieve a prior FQPC so that it may identify the necessary fields for a CDR that are not provided in the RPC. The secondary CGF can then assemble a FQPC based on the data from a prior FQPC and data from the RPC. Therefore, charging for the session can be handled in an effective manner even though the primary CGF goes OOS.

Example

Figure 3:
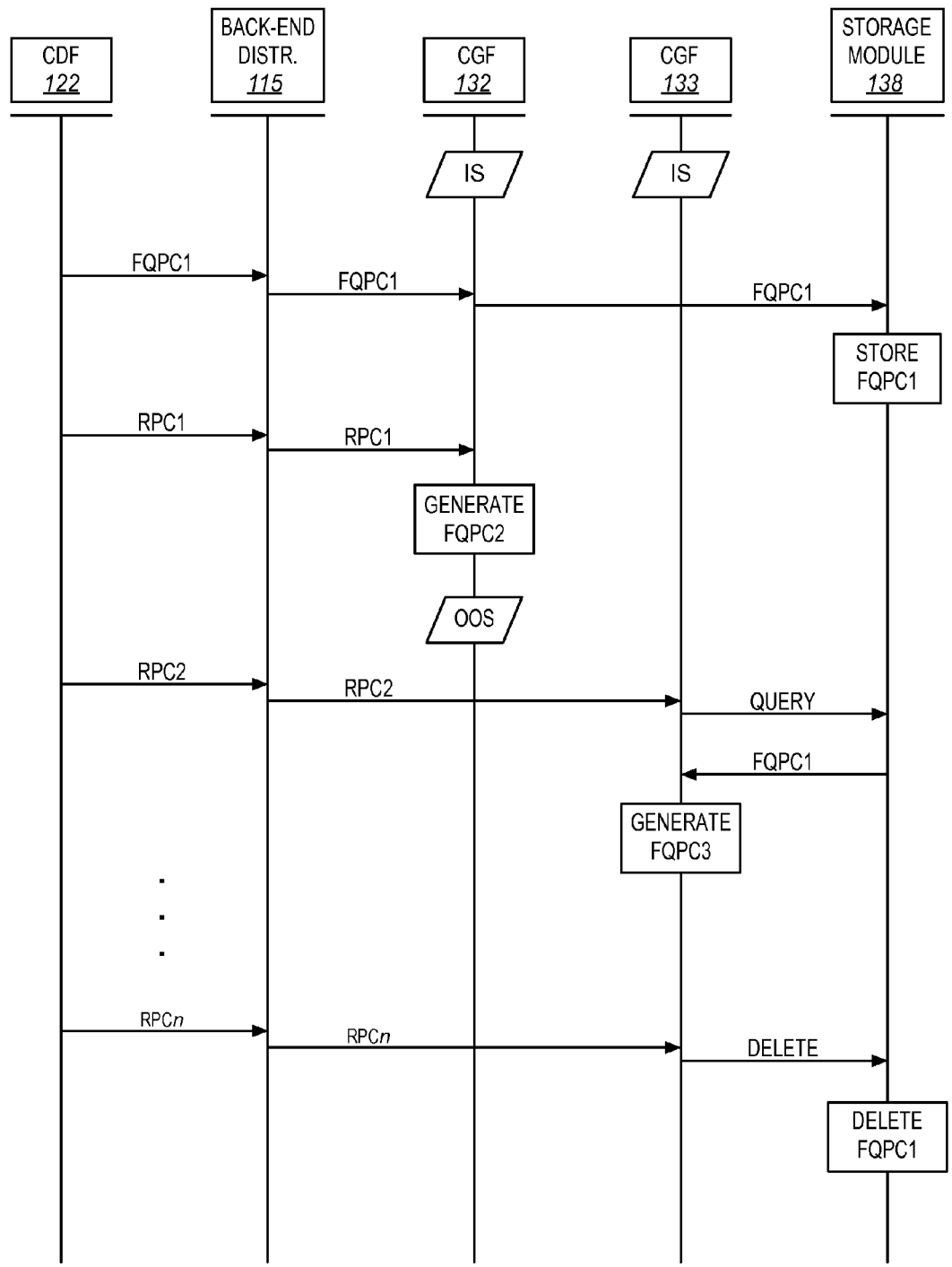
FIG. 3 is a flow diagram illustrating RPC handling in an exemplary embodiment.

The following provides an example of handling RPCs within an offline charging architecture, such as shown in FIG. 1. FIG. 3 is a flow diagram illustrating RPC handling in an exemplary embodiment. To begin, it is assumed that there is a session in progress. The session is identified by a charging ID, such as an IMS Charging Identifier (ICID, 3GPP standard AVP code 841), with the value "STAS: 135.251.85.197-4bb3f32f-000004ab". For a given session, the charging ID would remain unchanged as the standards specify. For this session, CDF 122 triggers a partial CDR for the session, which is a first FQPC (FQPC1) for the session. CDF 122 then sends the FQPC1 to back-end distributor 115. Back-end distributor 115 selects CGF 132 to correlate CDRs (which may be referred to as the primary CGF), and forwards the FQPC1 to CGF 132.

In response to receiving the FQPC1 for the session, CGF 132 stores a copy of the FQPC1 in local memory. Internal logic within CGF 132 also controls that CGF 132 stores a copy of the FQPC1 in centralized storage module 138. In this embodiment, centralized storage module 138 may comprise cloud storage implemented on an OpenStack™ platform. Therefore, this embodiment would consider the OpenStack™ Swift for storing the objects, which would be the FQPC for a session. The OpenStack™ Swift Object Store API defines "account" (an authenticated user allowed to access the object store, which in this case would be multiple CGF instances which would share a common account), "container" (akin to a directory where multiple files can be stored, which in this case would be a single container across the topology of CGFs), and "object" (which in this case would be a file for each individual FQPC).

During an initialization phase, a container may be created in centralized storage module 138 for FQPCs. This is achieved by using the container commands available via the OpenStack™ object store API, which exposes four verbs:

GET—retrieve all containers for a specific account;

HEAD—retrieve how many objects are in a container and any custom metadata that is associated with the container;

PUT—creates a container in an account with an optional policy; and

DELETE—deletes a specific container.

As part of system initialization, a container may be created in OpenStack™ Swift via using the PUT verb:

PUT v1.0/{account}/{container}

The "account" parameter represents the common CGF account (e.g., "CGF"), and the "container" parameter may indicate the type of data stored in the container (e.g., "FQPC").

To store a copy of the FQPC1 in centralized storage module 138, CGF 132 uploads a representative object of the FQPC1 into centralized storage module 138. CGF 132 creates an object (i.e., file) for the FQPC1, and also assigns a name to the object. The name of the object may include or be based on the charging ID (e.g., ICID) assigned to the session. For example, if the charging ID is "STAS: 135.251.85.197-4bb3f32f-000004ab", then the object name may include the charging ID. CGF 132 then uploads this object into the Swift Object Store, such as using the following PUT command:

```
$ curl -X PUT -i \
  -H "X-Auth-Token: fa77bcd6-98a1-dab0-d4ba-aba90ab9ae" \
  -T STAS:135.251.85.197-4bb3f32f-000004ab \
  https://commonobjectstore.cloud.swiftdrive.com/v1/CF_xer7_343/FQPC/STAS:135.251.85.197-4bb3f32f-000004ab.
```

In response to the PUT command from CGF 132, centralized storage module 138 stores the object in the container for "FQPC". The object for the FQPC1 is a reference for other CGFs to use if they receive a RPC for the session.

At a later time, CDF 122 triggers another partial CDR for the session. Because CDF 122 has already generated a FQPC for the session, CDF 122 generates a first RPC (RPC1) for the session upon this triggering event. CDF 122 sends the RPC1 to back-end distributor 115. Back-end distributor 115 again selects CGF 132 to correlate CDRs, and sends the RPC1 to CGF 132. Because CGF 132 stores a copy of the FQPC1 in local memory, CGF 132 is able to construct another FQPC (FQPC2) for the session based on data from the RPC1 and data from the FQPC1.

When CDF 122 triggers another partial CDR for the session, this partial CDR may again be a RPC (RPC2). CDF 122 sends the RPC2 to back-end distributor 115. Back-end distributor 115 again selects CGF 132 to correlate CDRs, but CGF 132 has gone Out-Of-Service (OOS). Therefore, back-end distributor 115 selects a back-up or secondary CGF, which is CF 133. Back-end distributor 115 then sends the RPC2 for the session to CGF 133. When CGF 133 receives the RPC, it needs to construct another FQPC for the session based on the RPC. However, CGF 133 has not received a FQPC for the session that it can use to construct another FQPC from the RPC. Therefore, CGF 133 queries centralized storage module 138 to retrieve the FQPC data (for FQPC1) stored in centralized storage module 138.

To fetch the FQPC data from centralized storage module 138, CGF 133 may extract the charging ID associated with the session, which is STAS:135.251.85.197-4bb3f32f-000004ab, from the RPC. CGF 133 may then derive the name of the object for the FQPC data based on the charging ID. CGF 133 may then retrieve the object for the FQPC data based on the name of the object by assembling the following GET command:

```
$ curl -X GET \
    -H "X-Auth-Token: fa77bcd6-98a1-dab0-d4ba-aba90ab9ae" \
    https://commonobjectstore.cloud.swiftdrive.com/v1/CF_xer7_343/
FQPC/STAS:135.251.85.197-4bb3f32f-000004ab > STAS:135.251.85.197-4bb3f32f-
000004ab.
```

CGF 133 receives the FQPC from centralized storage module 138, and constructs another FQPC (FQPC3) for the session based on data from the RPC2 and data from the FQPC1 that was retrieved from centralized storage module 138.

If CGF 133 receives a RPC (RPCn) or another message indicating that the session identified by the charging ID "STAS:135.251.85.197-4bb3f32f-000004ab" has ended, then CGF 133 needs to purge this object for the FQPC from centralized storage module 138 as part of housekeeping. To purge the FQPC from centralized storage module 138, CGF 133 may assemble the following DELETE command:

```
$ curl -X DELETE -i \
    -H "X-Auth-Token: fa77bcd6-98a1-dab0-d4ba-aba90ab9ae" \
    https://commonobjectstore.cloud.swiftdrive.com/v1/CF_xer7_343/
FQPC/STAS:135.251.85.197-4bb3f32f-000004ab.
```

In response to the DELETE command, centralized storage module 138 deletes the object for this FQPC from the container.

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the disclosure is not limited to those specific embodiments. The scope of the disclosure is defined by the following claims and any equivalents thereof.

We claim:

1. An apparatus comprising:
an offline charging system comprising a cluster of Charging Gateway Functions (CGF) implemented on at least one hardware platform, the offline charging system includes:
 a first processor that implements a first CGF of the cluster that is configured to receive a first Fully Qualified Partial CDR (FQPC) for a session, and to store FQPC data from the first FQPC in a centralized storage module that is accessible by each of the CGFs in the cluster; and
 a second processor that implements a second CGF of the cluster that is configured to receive a Reduced Partial CDR (RPC) for the session responsive to a failure of the first CGF, to retrieve the FQPC data from the centralized storage module, and to generate a second FQPC for the session based on the RPC and the FQPC data retrieved from the centralized storage module.

2. The apparatus of claim 1 wherein:
the first CGF is configured to store the FQPC data as an object in the centralized storage module; and
the first CGF is configured to assign a name to the object based on a charging identifier (ID) assigned to the session.

3. The apparatus of claim 2 wherein:
the second CGF is configured to extract the charging ID for the session from the RPC, to derive the name of the object for the FQPC data based on the charging ID, and to retrieve the object for the FQPC data from the centralized storage module based on the name of the object.

4. The apparatus of claim 1 wherein:
the second CGF is configured to receive a third FQPC for the session, and to update the FQPC data in the centralized storage module based on the third FQPC.

5. The apparatus of claim 1 wherein:
the second CGF is configured to identify an end to the session, and to delete the FQPC data from the centralized storage module responsive to the end of the session.

6. The apparatus of claim 1 wherein:
the centralized storage module comprises cloud storage.

7. The apparatus of claim 1 wherein:
the offline charging system includes a back-end distributor connected between the cluster of CGFs and a cluster of Charging Data Functions (CDF); and
the back-end distributor is configured to distribute partial CDRs from the cluster of CDFs to the cluster of CGFs.

8. The apparatus of claim 1 wherein:
if the second CGF received a prior FQPC for the session, then the second CGF is configured to retrieve the prior FQPC from local memory, and to generate the second FQPC for the session based on the RPC and the prior FQPC retrieved from the local memory.

9. A method of operating an offline charging system comprising a cluster of Charging Gateway Functions (CGF) implemented on at least one hardware platform, the method comprising:
receiving a first Fully Qualified Partial CDR (FQPC) for a session in a first CGF of the cluster;
storing, by the first CGF, FQPC data from the first FQPC in a centralized storage module that is accessible by each of the CGFs in the cluster;
receiving a Reduced Partial CDR (RPC) for the session in a second CGF of the cluster responsive to a failure of the first CGF;
retrieving, by the second CGF, the FQPC data from the centralized storage module; and
generating, by the second CGF, a second FQPC for the session based on the RPC and the FQPC data retrieved from the centralized storage module.

10. The method of claim 9:
wherein storing the FQPC data in a centralized storage module comprises storing the FQPC data as an object in the centralized storage module; and
further comprising:
assigning a name to the object based on a charging identifier (ID) assigned to the session.

11. The method of claim 10 further comprising:
extracting, by the second CGF, the charging ID for the session from the RPC;
deriving the name of the object for the FQPC data based on the charging ID; and
retrieving, by the second CGF, the object for the FQPC data from the centralized storage module based on the name of the object.

12. The method of claim 9 further comprising:
receiving, by the second CGF, a third FQPC for the session; and
updating the FQPC data in the centralized storage module based on the third FQPC.

13. The method of claim 9 further comprising:
identifying an end to the session in the second CGF; and
deleting the FQPC data for the session from the centralized storage module responsive to the end of the session.

14. An apparatus comprising:
an offline charging system comprising a cluster of Charging Gateway Functions (CGF) implemented on at least one hardware platform, wherein the offline charging system includes:
a first processor that implements a Charging Data Function (CDF) that generates a partial Charging Data Record (CDR) for a session; and
a second processor that implements a CGF of the cluster that is configured to receive the partial CDR, and to determine whether the partial CDR comprises a Fully Qualified Partial CDR (FQPC) or a Reduced Partial CDR (RPC);
when the partial CDR comprises a FQPC, the CGF is configured to store FQPC data from the FQPC in a centralized storage module that is accessible by each of the CGFs in the cluster;
when the partial CDR comprises a RPC, the CGF is configured to determine whether a prior FQPC was received for the session in the CGF, to retrieve the FQPC data from the centralized storage module responsive to a determination that the prior FQPC was not received in the CGF, and to generate a second FQPC for the session based on the RPC and the FQPC data retrieved from the centralized storage module.

15. The apparatus of claim 14 wherein:
when the partial CDR comprises a RPC, the CGF is configured to retrieve the FQPC data from local memory responsive to a determination that the prior FQPC was received in the CGF, and to generate the second FQPC for the session based on the RPC and the FQPC data retrieved from the local memory.

16. The apparatus of claim 14 wherein:
the CGF is configured to store the FQPC data as an object in the centralized storage module; and
the CGF is configured to assign a name to the object based on a charging identifier (ID) assigned to the session.

17. The apparatus of claim 16 wherein:
the CGF is configured to extract the charging ID for the session from the RPC, to derive the name of the object for the FQPC data based on the charging ID, and to retrieve the object for the FQPC data from the centralized storage module based on the name of the object.

18. The apparatus of claim 14 wherein:
the CGF is configured to identify an end to the session, and to delete the FQPC data from the centralized storage module responsive to the end of the session.

19. The apparatus of claim 14 wherein:
the centralized storage module comprises cloud storage.

20. The apparatus of claim 14 wherein:
the offline charging system includes a back-end distributor connected between the cluster of CGFs and the CDF; and
the back-end distributor is configured to distribute partial CDRs from the CDF to the cluster of CGFs.

* * * * *